(12) United States Patent
Coussey et al.

(10) Patent No.: US 8,739,563 B2
(45) Date of Patent: Jun. 3, 2014

(54) ADAPTABLE EVAPORATOR DEFROST LOGIC FOR AN AIRCRAFT

(75) Inventors: Kodjovi Coussey, Manchester, CT (US); Richard Rusich, Ellington, CT (US); Tejendra Patel, Ellington, CT (US); Anson Stark Coolidge, Palm City, FL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 560 days.

(21) Appl. No.: 13/091,657

(22) Filed: Apr. 21, 2011

(65) Prior Publication Data
US 2012/0266615 A1 Oct. 25, 2012

(51) Int. Cl.
F25D 21/06 (2006.01)

(52) U.S. Cl.
USPC .......... 62/156; 62/80; 62/81; 62/140; 62/151; 62/DIG. 5

(58) Field of Classification Search
USPC ........... 62/80, 81, 140, 150, 151, 156, DIG. 5
See application file for complete search history.

(56) References Cited

U.S. PATENT DOCUMENTS

| | | | | |
|---|---|---|---|---|
| 5,065,593 A * | 11/1991 | Dudley et al. | ................... | 62/182 |
| 6,434,958 B1 * | 8/2002 | Koors et al. | ................... | 62/176.1 |
| 7,275,376 B2 * | 10/2007 | Swofford et al. | ................. | 62/81 |
| 2005/0241324 A1 * | 11/2005 | Cho et al. | ........................ | 62/150 |

* cited by examiner

Primary Examiner — Cheryl J Tyler
Assistant Examiner — Jonathan Bradford
(74) Attorney, Agent, or Firm — Kinney & Lange, P.A.

(57) ABSTRACT

Adaptable evaporator defrost logic is employed in a refrigeration system to detect a build-up of ice on the evaporator. In response to the detected build-up of ice, a defrost operation is initiated that includes decreasing the speed of the compressor. At the end of the defrost operation, the adaptable evaporator defrost logic determines whether the defrost operation was a success. If the defrost operation was a success, then normal operation is resumed. If the defrost operation was not a success, then the defrost operation is modified by turning the compressor off and extending a duration of the defrost operation.

15 Claims, 3 Drawing Sheets

ADAPTABLE EVAPORATOR DEFROST LOGIC FOR AN AIRCRAFT

BACKGROUND

The present invention relates generally to evaporators, and in particular to defrost operations associated with evaporators.

Evaporators are commonly employed as part of a refrigeration system, wherein the evaporator converts a liquid refrigerant to a gas, thereby absorbing heat and providing cooling. In some applications, the refrigerant employed by the evaporator operates at a temperature below the freezing point of water. As a result, cooling fins on the evaporator through which the refrigerant flows may cause water vapor in the air being cooled to condense and freeze as it passes through the evaporator. As a result of the freezing water vapor, ice forms on the outside surface of the cooling fins, causing them to "plate out". This buildup of ice reduces the efficiency of the evaporator. In addition, as ice builds up on the fins, the load on the compressor drawing refrigerant through the evaporator decreases, causing the refrigerant temperature to fall even further and thereby causing ice to form more quickly.

In response, refrigeration systems periodically employ a defrost operation to melt the ice build up on the fins of the evaporator. Typically, the defrost operation is implemented on a periodic schedule (e.g., every hour, day, etc.). However, there are a number of drawbacks to employing purely periodic defrost operations, such as running the defrost operation when none is required (lowering efficiency of the system), or running the defrost operation too late, such that the defrost operation is insufficient to melt the build-up of ice.

SUMMARY

Adaptable evaporator defrost logic is employed in a refrigeration system to detect a build-up of ice on the evaporator. In response to the detected build-up of ice, an adaptable defrost operation is initiated that includes decreasing the speed of the compressor. At the end of the defrost operation, the adaptable evaporator defrost logic determines whether the defrost operation was a success. If the defrost operation was a success, then normal operation is resumed. If the defrost operation was not a success, then the defrost operation is modified by turning the compressor off and extending a duration of the defrost operation.

DETAILED DESCRIPTION

Adaptable evaporator defrost logic for a refrigeration system detects the presence of ice build-up on an evaporator unit included as part of the refrigeration system, and in response initiates an adaptable defrost operation to melt the build-up of ice while minimizing the impact of the defrost operation on the efficiency of the refrigeration system.

Figure 1:
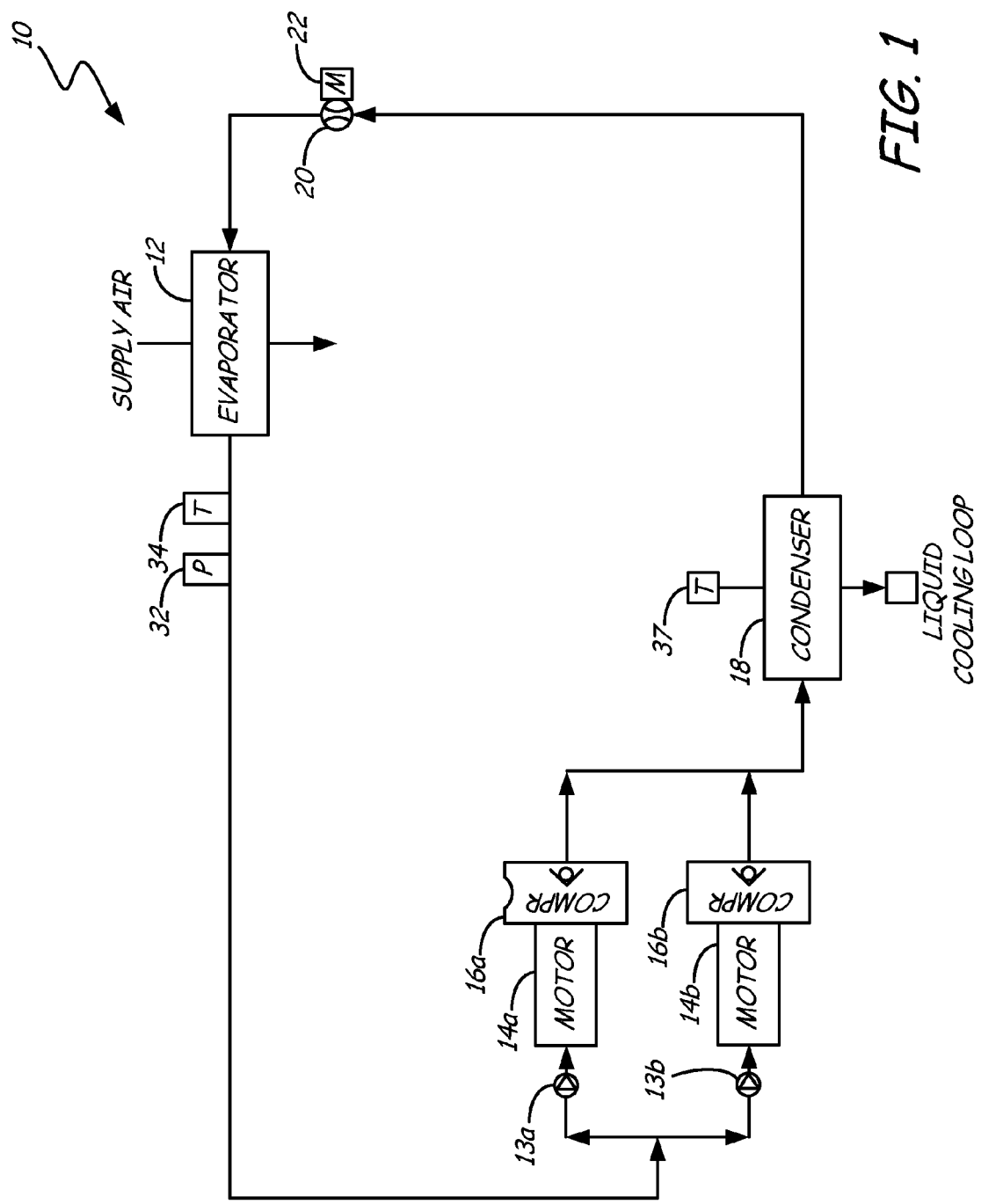
FIG. 1 is a block diagram of a refrigeration unit according to an embodiment of the present invention.

FIG. 1 is a block diagram of a refrigeration system 10 according to an embodiment of the present invention. Refrigeration system 10 includes evaporator 12, check valves 13a, 13b, motors 14a, 14b, compressors 16a, 16b, condenser 18, electronic expansion valve (EEV) 20, and EEV motor 22. The arrowed lines extending between evaporator 12, compressors 16a, 16b, condenser 18, and EEV 20 indicate the flow and direction of refrigerant circulated in refrigeration system 10.

Refrigerant is provided from EEV 20 to evaporator 12 in a combination liquid-gaseous state. Evaporator 12 cools supply air passed through evaporator 12 through an evaporation process, in which the refrigerant is converted (i.e., evaporated) from a liquid-gaseous to a mostly or entirely gaseous state. The evaporation process absorbs heat from the supply air, thereby cooling it.

Compressors 16a, 16b are driven by motors 14a, 14b, respectively, to a desired speed. Compressors 16a, 16b compress the gaseous refrigerant provided by evaporator 12, and provide the compressed gaseous refrigerant to condenser 18. Condenser 18 condenses the gaseous refrigerant back into a liquid or mixed liquid-gaseous state, and provides the condensed refrigerant to a liquid pool (not shown) or directly to expansion valve 20 for supply to evaporator 12. Motor 22 opens and closes expansion valve 20 to regulate the flow of refrigerant provided to evaporator 12. In at least some embodiments, feedback regarding the flow of refrigerant provided to evaporator 12 is based on monitoring of the pressure at the output of evaporator 12. The position of expansion valve 20 is controlled to maintain the monitored pressure at or below a maximum operating pressure (MOP).

The refrigerant provided to evaporator 12 operates at a temperature below the freezing point of water. As a result, water vapor in the supply air provided to evaporator 12 condenses and freezes onto the surface of cooling fins (not shown) of evaporator 12. The resulting build-up of ice on the cooling fins (known as "plating out") reduces the effectiveness of evaporator 12. As a result of the decreased effectiveness of evaporator 12, the load on compressors 16a, 16b is reduced, which causes the pressure and temperature associated with evaporator 12 to decrease. The decrease in pressure and temperature in evaporator 12 causes ice to form more quickly, further reducing the effectiveness of the evaporator.

To detect the necessity of a defrost operation, a temperature sensor (not shown) installed on the fins of evaporator 12 may be used to detect the presence of ice build-up on evaporator 12. When the temperature drops below a threshold value, this is indicative of ice build-up on the evaporator necessitating a defrost operation. Alternatively, the pressure of the refrigerant exiting evaporator 12 as detected by pressure sensor 32 is used to detect the presence of ice build-up on evaporator 12. As ice builds on evaporator 12, the pressure of the refrigerant at the output of evaporator 12 decreases. When the measured pressure decreases below a threshold value, this is indicative of ice build-up. A benefit of need-based defrost detection, as opposed to periodic defrost operations, is unnecessary defrost conditions are avoided in some conditions, and defrost operations can be started earlier than anticipated in other conditions. In addition, a benefit of employing pressure sensor 32 to detect ice build-up, is it obviates the need for a separate temperature sensor on the fins of evaporator 12.

The purpose of the defrost operation is to melt the ice built up on the fins of evaporator 12. One or more of the following actions may be employed to achieve this end, including: reducing the compressor speed to a minimum speed, and/or closing (partially) expansion valve 20. Reducing the compressor speed slows the flow of refrigerant through evaporator 12, thereby increasing the temperature of the refrigerant in evaporator 12 and melting ice build-up on the fins of evaporator 12. Likewise, partially closing expansion valve 20 reduces the flow of refrigerant provided to evaporator 12, thereby increasing the temperature of the refrigerant and melting ice build-up on the fins of evaporator 12. In one embodiment, the position of expansion valve 20 is modified during defrost operations by decreasing the MOP reference associated with the system. The decreased MOP reference results in expansion valve 20 being closed to maintain the pressure at the output of evaporator 12 at or below the decreased MOP reference.

During execution of the defrost operation, feedback from evaporator 12, including pressure and/or temperature feedback, is used to determine the effectiveness of the defrost operation. If the defrost operation is not effective, additional steps, such as turning Off one (in a single compressor operation) or both compressors 16a, 16b and/or increasing the duration of the defrost operation may be employed to ensure melting of ice build-up. In this way, not only is the decision of when to execute the defrost operation adaptable, but the execution of the defrost operation itself is adaptable based on the effectiveness of the operation.

Figure 2:
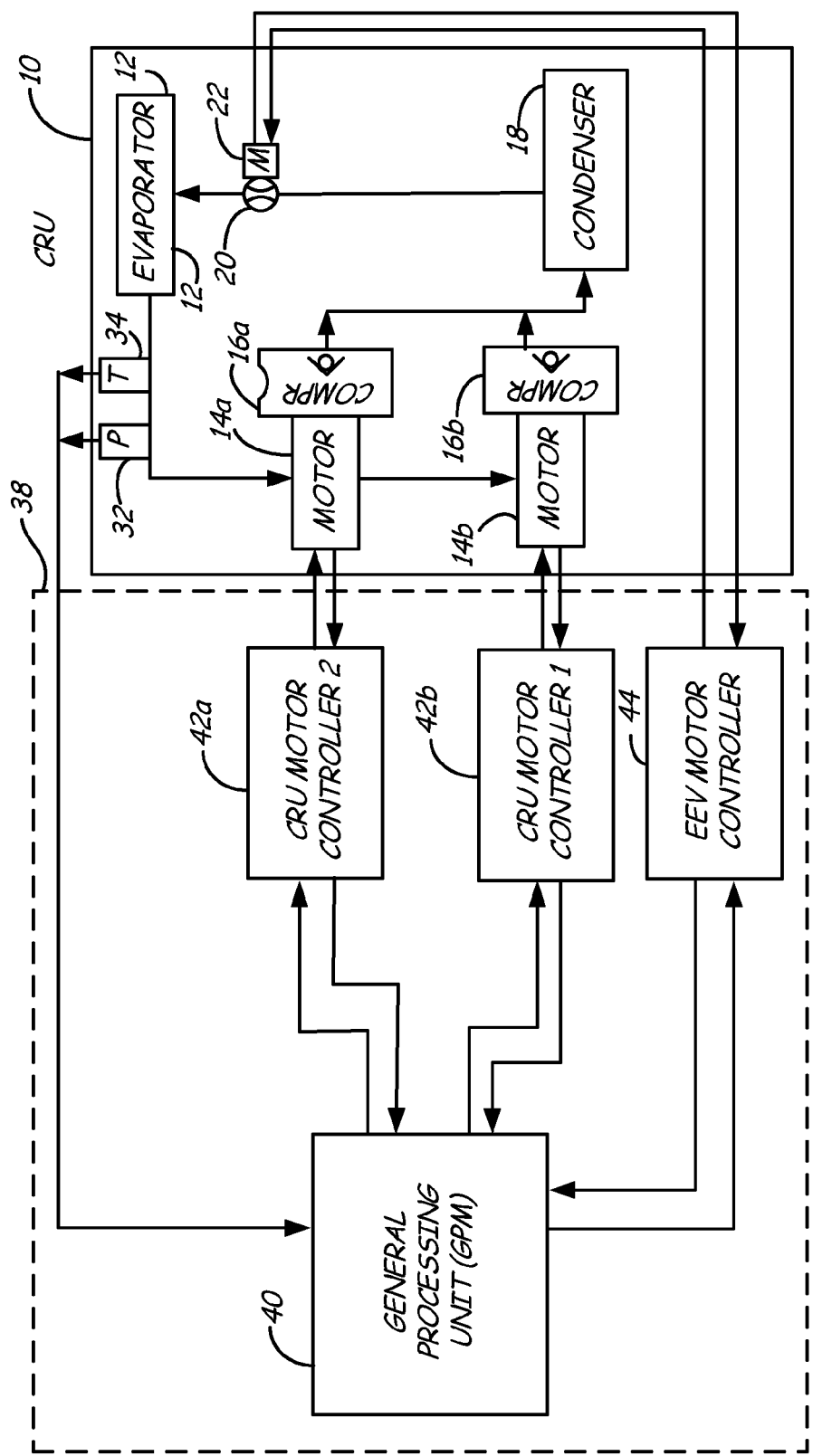
FIG. 2 is block diagram of a controller system for controlling the operation of the refrigeration unit.

FIG. 2 is a block diagram of a controller system 38 for controlling the operation of the refrigeration system 10. The controller system includes processing unit 40, first and second motor controllers 42a, 42b controlling compressor motors 14a and 14b, respectively, and electronic expansion valve (EEV) motor controller 44. In one embodiment, EEV motor controller 44 is included in either first motor controller 42a or second motor controller 42b, but for the sake of simplicity is illustrated here as a separate entity. Processing unit 40 includes hardware and software (e.g., hosted applications) that it executes to control the operation of refrigeration system 10, including implementation of adaptable evaporator defrost logic used to implement defrost operations. Processing unit 40 receives feedback such as pressure sensor feedback from pressure sensor 32 and/or temperature feedback from a temperature sensor located on the fin of evaporator 12 (not shown). In response to these inputs, processing unit 40 detects the build-up of ice necessitating a defrost operation.

Processing unit 40 executes the adaptable evaporator defrost logic through selective control of motor controllers 42a, 42b and EEV motor controller 44. For example, to reduce the speed of the compressors 16a, 16b to a minimum speed, processing unit 40 provides commands to motor controllers 42a, 42b, which respond by controlling the operation of motors 14a, 14b, respectively to a desired speed. Likewise, to reduce the pressure of the refrigerant provided to evaporator 12, processing unit 40 provides command to EEV motor controller 44, which relays instructions to EEV motor 22 to selectively close electronic expansion valve 20. In other embodiments, EEV motor controller 44 is included as part of either compressor motor controller 42a, 42b, and the selected compressor motor controller 42a, 42b acts to regulate the position of expansion valve 20.

Figure 3:
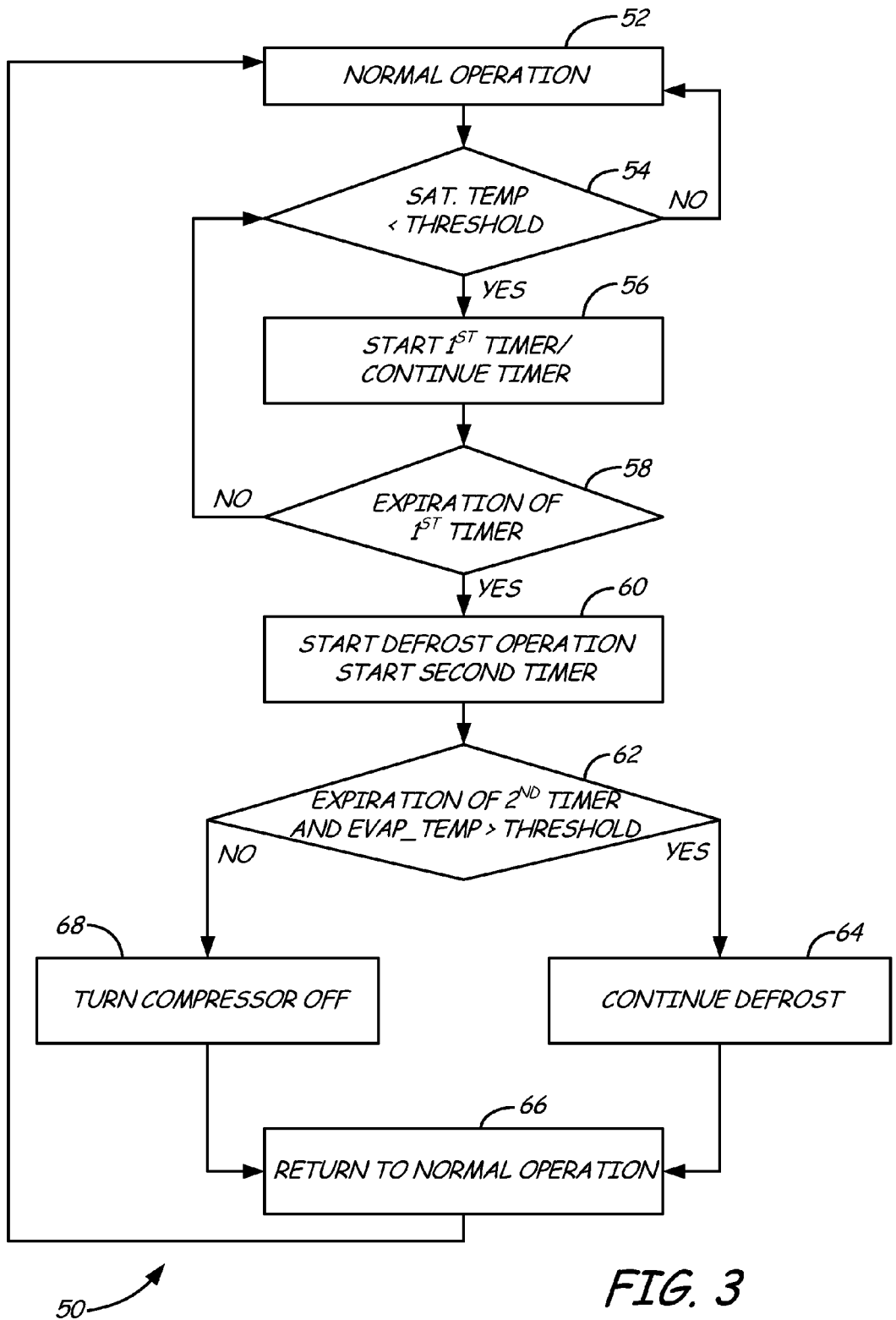
FIG. 3 is a flowchart illustrating automatic defrost logic implemented by the controller system according to an embodiment of the present invention.

FIG. 3 is a flowchart illustrating adaptable evaporator defrost logic 50 implemented by processing unit 40 according to an embodiment of the present invention.

At step 52, refrigeration system 10 is operating normally, with at least one compressor 16a, 16b operating at normal speed (e.g., 2000 RPM), and EEV 20 operating to provide a desired refrigerant pressure to evaporator 12.

At step 54, a saturation temperature is compared to a threshold value to detect the presence of ice on evaporator 12. The saturation temperature is based on the suction pressure measured by pressure sensor 32 at the output of evaporator 12. If the saturation temperature is greater than a threshold value, this indicates that no, or only minimal, ice build-up is present on evaporator 12, and no defrost operations are required. Refrigeration system 10 continues operating normally, with periodic checks of the saturation temperature. If the saturation temperature is less than the threshold value, this is indicative of ice build-up on the fins of evaporator 12, requiring initiation of a defrost operation. In other embodiments, rather than rely on pressure measurements, an additional temperature sensor is included on the fins of evaporator 12 to detect ice build-up.

At step 56, in response to the saturation temperature falling below the threshold value, a first timer is started. The first timer allows for the passage of some set amount of time before changing the operation of refrigeration system 10 to melt ice on evaporator 12. During this time, evaporator 12 continues to operate normally, despite the presence of some ice building up on the fins of evaporator 12. At step 58, the timer is compared to a timer threshold value that determines the length of time evaporator 12 is allowed to run before beginning the defrost operation. In one embodiment, the timer threshold value (i.e., the duration of time) is variable, and depends on current operating characteristics of refrigeration system 10. For example, in aircraft applications, when the aircraft is on the ground (typically more humid), ice may begin to form in a short amount of time. As the aircraft takes off and flies to a higher altitude, the humidity level drops and ice build-up takes longer to form. In this example, if the aircraft is on the ground, the timer threshold value may be set to a relatively low value (e.g., 15 minutes), but if the aircraft is in flight, then the timer value may be set to a higher value (e.g., 30 minutes). In this way, evaporator defrost logic is adaptable, taking into account the current operating conditions of refrigeration system 10.

In addition, if at step 58 the timer has not exceeded the timer threshold value, then defrost logic 50 continues monitoring the saturation temperature at step 54. If at any time prior to expiration of the timer (i.e., before the timer threshold value is exceeded), the saturation temperature increases above the threshold value, then the timer is stopped and normal operation continues at step 52.

At step 60, following the expiration of the first timer (i.e., timer threshold value is reached), the defrost operation is initiated. The defrost operation may include reducing the speed of compressors 16a, 16b, and/or partially closing EEV 20 to reduce the flow of refrigerant provided to evaporator 12. In one embodiment, the compressor speed is reduced as a function of the temperature of the liquid coolant measured by temperature sensor 37 (associated with condenser 18, shown in FIG. 1). As the flow provided by compressors 16a, 16b decreases, the heat absorbed by the refrigerant in evaporator 12 and provided to condenser 18 increases. Therefore, the speed of compressors 16a, 16b is set to a minimum value while maintaining the liquid coolant below a threshold value.

Either alternatively, or in addition to decreasing the speed of compressors 16a, 16b, EEV 20 is partially closed to reduce the flow of refrigerant provided to evaporator 12. In one embodiment, the closing of EEV 20 is controlled by decreasing the maximum operating pressure (MOP) reference associated with refrigeration system 10. To effectuate the lowered MOP reference value, processing unit 40 causes EEV 20 to partially close. As a result, the superheat associated with refrigeration system 10 increases. In one embodiment, the MOP reference value is decreased from a value of fifty-five pounds-per-square inch (PSI) to sixteen PSI.

In addition, at step 60, a second timer is started. At step 62, the second timer is compared to a threshold value to determine whether the timer has expired and the evaporator outlet temperature (measured by temperature sensor 34) is compared to a threshold value. In other embodiments, the saturation temperature (employed at step 54 to enter the defrost operation) may be employed in place of or in addition to the evaporator outlet temperature to exit the defrost operation at step 62. In one embodiment, the timer threshold value (i.e., the duration of time) to which the second timer is compared is also variable, and depends on current operating characteristics of refrigeration system 10. For example, in the aircraft application, the threshold value associated with the second timer may be set to expire at four minutes when the aircraft is on the ground, but set to expire at three minutes if the aircraft is in flight. In one embodiment, the threshold value to which the saturation temperature is compared at step 62 is the same as the threshold value employed at step 54.

In the embodiment shown in FIG. 3, if the second timer expires (i.e., reaches the threshold value) without the evaporator outlet temperature increasing above the threshold value, this indicates that the defrost operation has not been successful. At step 68, to increase the heat absorbed by evaporator 12 and thereby aid in the defrost operation, compressors 16*a*, 16*b* are turned Off for a duration of time. Once again, the duration that compressors 16*a*, 16*b* are turned Off may depend on the operating conditions of the refrigeration unit (e.g., aircraft on the ground, or in flight). Following expiration of the timer at step 68, compressors 16*a*, 16*b* are turned On at step 66, and normal operation continues at step 52.

If at any time during the duration of the second timer the measured evaporator outlet temperature increases above the threshold value, this indicates that the defrost operation is working. Following the expiration of the second timer at step 62, at step 64 the defrost operation continues for a duration of time. The duration of time that the defrost operation is continued may once again be variable, and depend on the operating conditions of the refrigeration unit. In the example shown in FIG. 3, the defrost actions are continued for two minutes if the aircraft is on the ground, and a minute and a half if the aircraft is in the air. At step 66 the defrost operation is ended, and normal operation continues at step 52.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of adaptably defrosting an evaporator in a refrigeration system installed on an aircraft, the method comprising:
   detecting a build-up of ice on the evaporator in the refrigeration system installed on the aircraft;
   initiating in response to detecting the build-up of ice an adaptable defrost operation that includes reducing compressor speed of a compressor to a minimum value greater than zero, wherein the defrost operation includes waiting for a first duration of time after detecting the build-up of ice on the evaporator before initiating the defrost operation, wherein the first duration of time is variable and is based on operating conditions of the refrigeration system that include whether the aircraft is on the ground or in the air; and
   determining whether the defrost operation was successful, wherein if the defrost operation was successful then normal operation is resumed at the expiration of the defrost operation, wherein if the defrost operation was not successful, then the defrost operation is modified by turning the compressor off and extending a duration of the defrost operation.

2. The method of claim 1, wherein the adaptable defrost operation further includes reducing a flow of refrigerant provided to the evaporator by at least partially closing an electronic expansion valve (EEV).

3. The method of claim 1, wherein detecting the build-up of ice on the evaporator includes monitoring a temperature provided by a temperature sensor on the evaporator to detect the build-up of ice.

4. The method of claim 1, wherein detecting the build-up of ice on the evaporator includes monitoring pressure associated with the refrigerant provided at an output of the evaporator to detect the build-up of ice on the evaporator.

5. The method of claim 1, wherein detecting the build-up of ice on the evaporator includes monitoring temperature associated with fins of the evaporator to detect the build-up of ice on the evaporator.

6. The method of claim 1, wherein the defrost operation runs for a second duration of time, wherein the second duration of time is variable and is based on the operating conditions of the refrigeration system.

7. The method of claim 6, wherein if the defrost operation is not successful, the defrost operation continues for a third duration of time that is variable, and depends on the operating conditions of the refrigeration system.

8. A controller system for a refrigeration system installed on an aircraft, the refrigeration system including at least an evaporator, a compressor and a refrigerant circulated between the evaporator and the compressor, wherein the flow of refrigerant through the evaporator is based, in part, on a speed of the compressor, the controller system comprising:
   a compressor controller that controls the speed of the compressor of the refrigeration system installed on the aircraft; and
   a processor unit connected to provide control instructions to the compressor controller to control the operation of the compressor, wherein the processing unit monitors refrigerant pressure provided at an output of the evaporator, and based on the monitored refrigerant pressure detects the presence of ice build-up on the evaporator, wherein in response to detected ice build-up the processor unit implements an adaptable defrost operation that includes reducing the speed of the compressor, wherein the adaptable defrost operation implemented by the processor unit includes waiting for a first duration of time after detecting the build-up of ice on the evaporator before initiating the defrost operation, wherein the first duration of time is variable and is based on operating conditions of the refrigeration system that include whether the aircraft is on the ground or in the air.

9. The system of claim 8, wherein the refrigeration system further includes an electronic expansion valve (EEV) connected to regulate the flow of refrigerant provided to the evaporator and the controller system further includes:
   an EEV controller that controls the position of the EEV, wherein in addition to reducing the speed of the compressor during the defrost operation, the processor unit provides control instructions to the EEV controller to cause the EEV controller to reduce the flow of refrigerant provided to the evaporator by partially closing the EEV.

10. The system of claim 9, wherein the EEV controller is included as part of the compressor controller.

11. The system of claim 8, wherein the processor unit runs the defrost operation for a second duration of time, wherein the second duration of time is variable and is based on the operating conditions of the refrigeration system.

12. The system of claim 11, wherein the processor unit determines at an expiration of the defrost cycle whether the defrost cycle was successful, wherein if the defrost operation was successful then normal operation is resumed at the expiration of the defrost operation, wherein if the defrost operation was not successful, then the defrost operation is modified by turning the compressor off and extending a duration of the defrost operation.

13. The system of claim 12, wherein if the defrost operation is not successful, the defrost operation continues for a third duration of time that is variable, and depends on the operating conditions of the refrigeration system.

14. A refrigeration and control system installed on an aircraft, the refrigeration and control system comprising:
- an evaporator that receives a refrigerant at an input and provides cooling to an airflow by evaporating the refrigerant;
- a compressor driven by a compressor motor to operate at a determined speed, wherein the speed of the compressor determines a flow rate of refrigerant through the evaporator;
- a condenser connected to condense the refrigerant provided by the compressor;
- an electronic expansion valve (EEV) selectively controlled by an EEV motor to control the flow of refrigerant provided to the evaporator; and
- a processing unit that provides control instructions to the compressor motor and the EEV motor to control the operation of the compressor and the EEV, the processing unit further connected to monitor a pressure associated with the refrigerant provided at the output of the evaporator, wherein the processing unit detects a build-up of ice on the evaporator based on the monitored pressure and in response executes an adaptable defrost operation that includes at least one of decreasing the speed of the compressor motor and at least partially closing the EEV value to decrease the flow of refrigerant provided to the evaporator, wherein the adaptable defrost operation includes waiting for a first duration of time after detecting the build-up of ice on the evaporator before initiating the defrost operation, wherein the defrost operation runs for a second duration of time, wherein if the defrost operation is not successful, the defrost operation continues for a third duration of time, and wherein at least one of the first duration of time, the second duration of time, and the third duration of time is variable and depends on operating conditions of the refrigeration system that include whether the aircraft is on the ground or in flight.

15. The refrigeration and control system of claim 14, wherein at the end of the second duration, the processing unit determines whether the defrost operation was successful, and wherein the defrost operation continuing during the third duration of time includes turning Off the compressors.

* * * * *